United States Patent
Zhang et al.

(10) Patent No.: US 8,711,580 B2
(45) Date of Patent: Apr. 29, 2014

(54) RESONANT CONVERSION SYSTEM WITH OVER-CURRENT PROTECTION PROCESSES

(75) Inventors: Jinfa Zhang, Taoyuan Hsien (TW); Lei Cai, Taoyuan Hsien (TW); Jiaojun Sun, Taoyuan Hsien (TW); Guodong Yin, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 292 days.

(21) Appl. No.: 13/112,532

(22) Filed: May 20, 2011

(65) Prior Publication Data

US 2011/0292688 A1    Dec. 1, 2011

(30) Foreign Application Priority Data

May 28, 2010    (CN) .......................... 2010 1 0187409

(51) Int. Cl.
*H02M 3/335*    (2006.01)
(52) U.S. Cl.
USPC .............. 363/21.02; 363/24; 363/25; 363/26; 363/49; 363/56.06; 363/56.07; 363/131; 363/133; 363/134; 323/901; 323/908

(58) Field of Classification Search
USPC ........ 363/21.02, 24, 25, 26, 49, 56.06, 56.07, 363/131, 133, 134; 323/901, 908
See application file for complete search history.

(56) References Cited

U.S. PATENT DOCUMENTS

| | | | |
|---|---|---|---|
| 2005/0180175 A1* | 8/2005 | Torrey et al. | 363/17 |
| 2006/0023476 A1* | 2/2006 | Fosler | 363/49 |
| 2007/0008745 A1* | 1/2007 | Joshi et al. | 363/21.01 |
| 2009/0303753 A1* | 12/2009 | Fu et al. | 363/20 |
| 2011/0090717 A1* | 4/2011 | Lee et al. | 363/21.02 |

* cited by examiner

*Primary Examiner* — Bao Q Vu
(74) *Attorney, Agent, or Firm* — Muncy, Geissler, Olds & Lowe, P.C.

(57)    ABSTRACT

A resonant conversion system is provided, in which a resonant converter receives an input voltage to generate an output voltage, and a buck converter provides the input voltage of the resonant converter, and controls the input voltage to perform an over-current protection process.

18 Claims, 15 Drawing Sheets

RESONANT CONVERSION SYSTEM WITH OVER-CURRENT PROTECTION PROCESSES

CROSS REFERENCE TO RELATED APPLICATIONS

This application claims priority of China Patent Application No. 201010187409.0, filed on May 28, 2010, the entirety of which is incorporated by reference herein.

BACKGROUND OF THE INVENTION

1. Field of the Invention

The present invention relates to a power conversion system, and in particular relates to a power resonant conversion system with over-current protection.

2. Description of the Related Art

The current trends in DC-DC converters, like most power products, are towards higher efficiencies, higher power densities, higher reliabilities and lower costs. In DC-DC converters, resonant converters (such as LLC converter) have the advantage of high efficiency in wide input voltage ranges. Therefore, there are more and more applications using resonant converters in recent years.

However, in practical applications, over-current protection (OCP) of resonant converters is an important issue. In an over-loaded state or short-circuit state, the resonant current of a resonant converters becomes extremely large. The resonant converter could be damaged due to over-current, if without restrictions and protections. FIG. 1 is a diagram of a resonant converter. At startup, the output capacitor CL in a secondary winding can be folded to the primary winding to parallel connect the LM. When the resonant converter is powered on, there is no voltage across the output capacitor CL. That is, the voltage levels on the two plates of the output capacitor are the same. Thus, the output capacitor CL can be regarded as a conducting wire. Therefore, the resonant converter can equivalently comprise a high frequency input voltage across the two terminals of the resonant tank/circuit, such that the impulsion of the resonant current is larger. The impulsion of the output current (the impulsion of the current flowing into the output capacitor CL) is also larger. Over-current protection not only provides rapid protection when the resonant conversion system is over-loaded and short-circuited, but also restricts the impulsion of the current at startup. In order to solve this problem, some methods have been developed to restrict current. However, there are some defects in these methods.

One conventional method for protecting a resonant converter with over-current protection is to increase the switching frequency. In the method, the switching frequency is increased much more than the resonant frequency of the resonant converter; thereby, increasing the resistance of the resonant tank/circuit for performing the current restriction. Although operation is easy, there are some defects in the method. For example, it results in increasing power consumption of the switch and the heat dissipation requirement becomes more increased, because the switching frequency of the resonant tank/circuit is higher than the normal operating frequency in an over-current protection state.

A second conventional method for protecting a resonant converter with over-current protection is to use a Pulse Width Modulation (PWM). In the method, the switching frequency of the resonant tank/circuit is increased at first. When the switching frequency is increased over a specific level, the PWM circuit starts to decrease the voltage applied on the resonant tank/circuit in order to perform the current restriction. However, the method is difficult to the control. During the current restriction procedure, the switching devices cannot be operated under the zero voltage switching ZVS, wherein the power consumption thereof would be increased.

In a third conventional method for protecting a resonant converter to perform current restriction, a diode is used to clamp the voltage across the resonant capacitor on the input voltage. FIG. 2 shows a symmetric full bridge resonant converter of the method. However, the clamping voltage is a DC input voltage Vin, and thus, the maximum voltage of the resonant capacitor Cr is only equal to the input voltage Vin and the change of the resonant voltage depends on the input voltage Vin. Thus, the result is more restrictions on the resonant circuit design.

BRIEF SUMMARY OF THE INVENTION

In light of the previously described problems, the invention provides an embodiment of a resonant conversion system, comprising a resonant converter and a buck converter. The resonant converter receives an input voltage to generate an output voltage. The buck converter provides the input voltage and controls the input voltage for performing an over-current protection process.

The invention also provides an embodiment of a resonant conversion system, comprising a resonant converter, a buck converter and a first controller. The buck converter provides a DC voltage to serve as an input voltage of the resonant converter such that the resonant converter generates an output voltage. The first controller controls the buck converter to decrease the input voltage received by the resonant converter for performing the over-current protection process, when determining that the resonant converter has generated an over-current.

The invention provides another embodiment of an over-current protection method, in which a signal corresponding to an output current of a resonant converter is detected to generate a first detection result. Whether the resonant converter generates an over-current is determined according to the first detection result. The buck converter is controlled to decrease an input voltage of the resonant converter for performing an over-current protection process, when the resonant converter generates the over-current.

The invention provides another embodiment of an over-current protection method, in which a duty cycle of a buck converter is progressively increased from a minimum duty cycle when a resonant conversion system is powered on, such that an input voltage of a resonant converter is progressively increased.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The invention provides a resonant conversion system with over-current protection. Embodiments of the invention can effectively provide over-current protection to restrict the output current or the resonant current of a resonant converter when the resonant conversion system is over-loaded, short-circuited or at startup. The invention also overcomes the defects described above.

Figure 1:
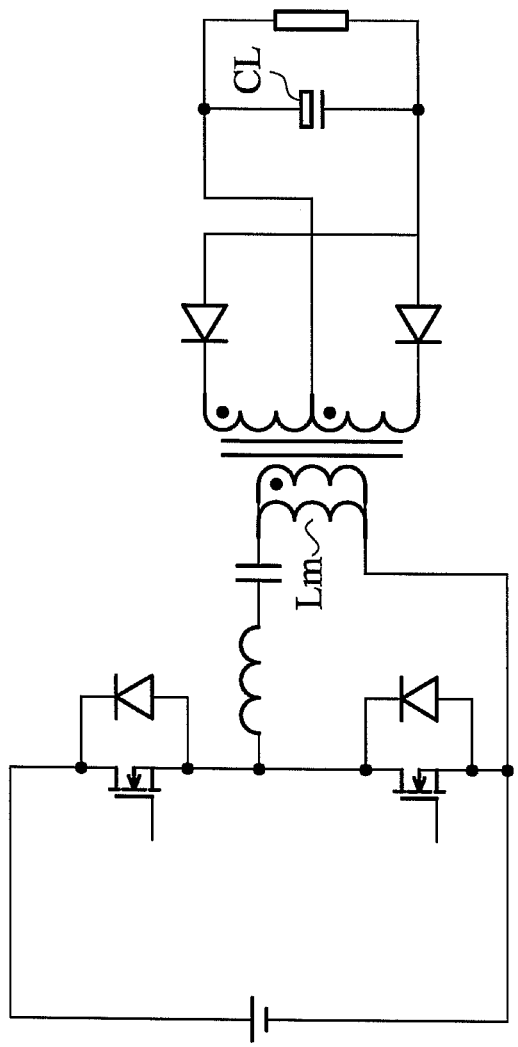
FIG. 1 is a diagram of the resonant converter.
Figure 2:
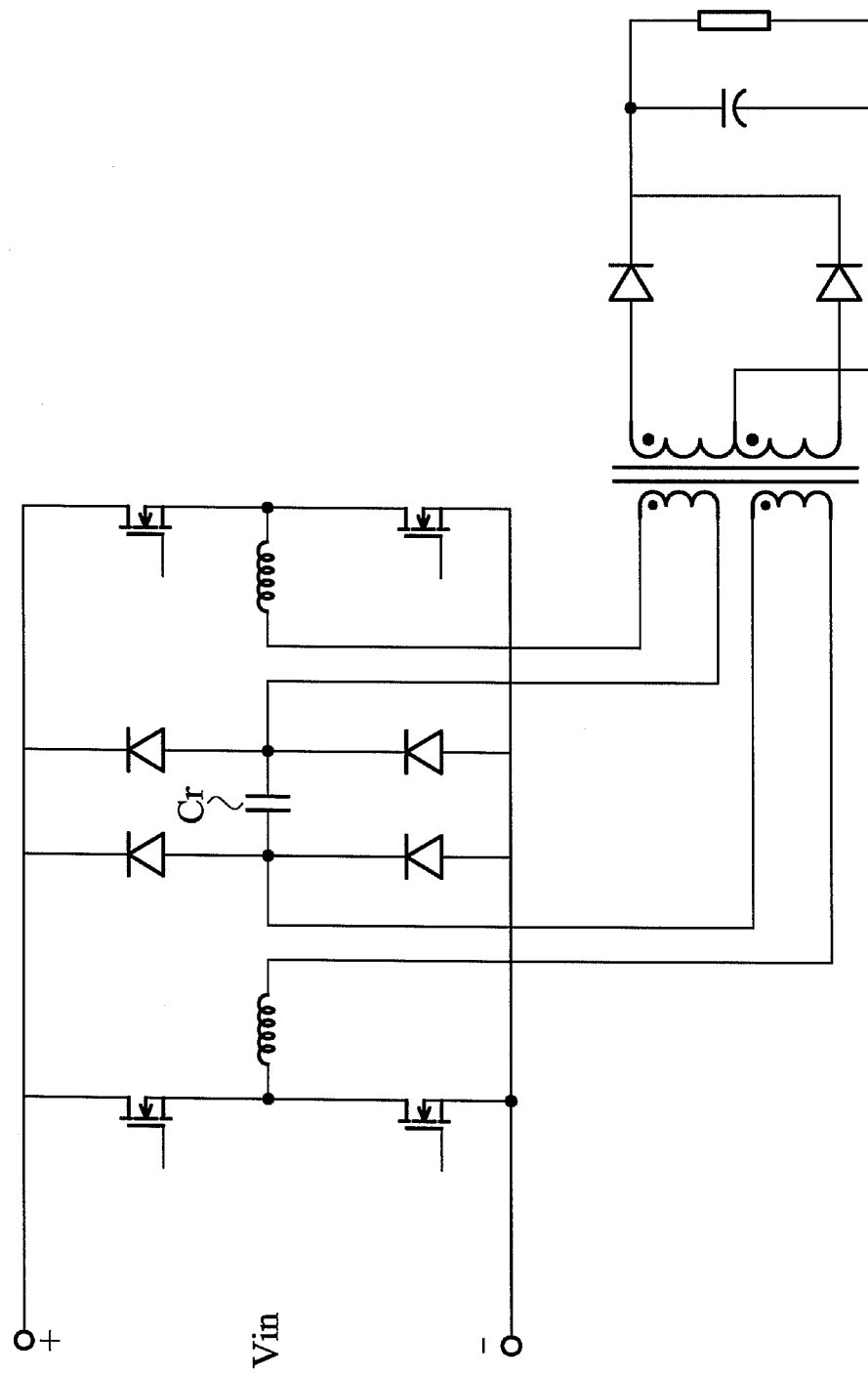
FIG. 2 is a full-bridge resonant converter with the diode clamp method.
Figure 3:
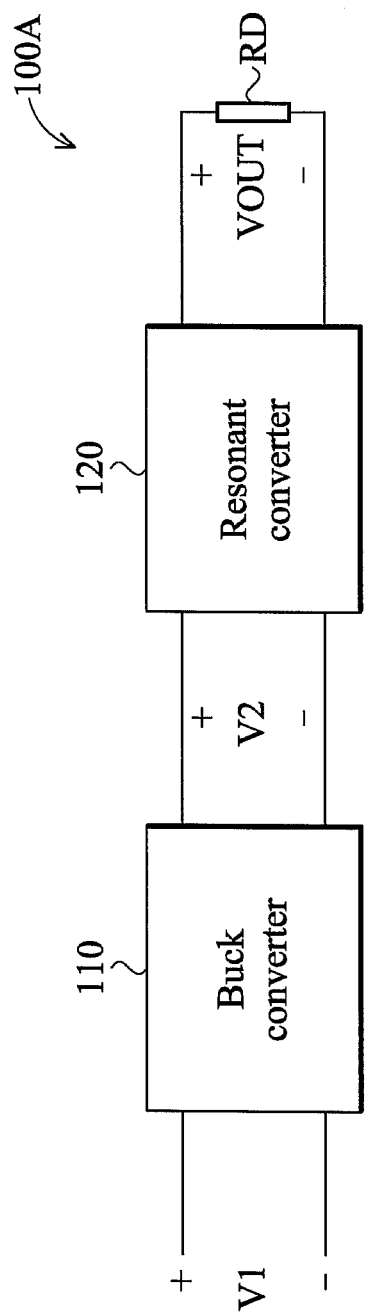
FIG. 3 is an embodiment of the resonant conversion system of the invention.

FIG. 3 depicts an embodiment of the resonant conversion system of the invention. As shown in FIG. 3, the resonant conversion system 100A comprises a buck converter 110 and a resonant converter 120. For example, the resonant conversion system 100A provides an output voltage VOUT to a load RD by receiving an input voltage V1. Furthermore, the resonant conversion system 100A can be implemented as a DC/DC converter, but is not limited thereto. The buck converter 110 adjusts the input voltage V1 to a voltage V2 to serve as the input voltage of the resonant converter 120. In this embodiment, the input voltage V1, the voltage V2 and the output voltage VOUT are DC voltages, but are not limited thereto. In some embodiments, the buck converter 110 which provides the voltage V2 to the resonant converter 120 can be replaced with a DC voltage generator. For example, a DC voltage generator is one of a buck converter and a buck-boost converter.

The resonant converter 120 generates the output voltage VOUT to the load RD according to the voltage V2 output from the buck converter 110. For example, the resonant converter 120 comprises a square wave generator, a resonant circuit, an output rectifying circuit and a control unit, but it is not limited thereto. The square wave generator provides a square wave voltage to the resonant circuit, and the square wave generator can be a half-bridge converter, a full-bridge converter, a push-pull converter or another converter. The square wave generator receives the input voltage V1 and then, according to the control signal(s) generated by the control unit, transfers the input voltage V1 into a square voltage for providing the square wave voltage to the resonant circuit. The resonant circuit can be formed with resonant devices (for example, inductors and capacitors) and resonates according to the square wave voltage of the resonant circuit. The output rectifying circuit generates the output voltage VOUT according to the output voltage generated by the resonance of the resonant circuit. For example, the output rectifying circuit can be a diode rectifying circuit or a synchronous rectifying circuit, but is not limited thereto. In one embodiment, the resonant converter 120 can be a non-regulated converter; which means that the resonant converter 120 is in an open-loop control and the output depends on the input thereof. In some embodiments, the resonant converter 120 can also be a regulated converter; which means that the resonant converter 120 is in a close-loop control and the output depends on a reference signal.

In this embodiment, the buck converter 110 controls (restricts) the input voltage of the resonant converter 120 for performing an over-current protection process. For example, the buck converter 110 is set to operate in a soft-start manner for performing the over-current protection process when the resonant conversion system 100A is powered on. In detail, when the resonant converter 100A is powered on, the duty cycle of the buck converter 110 is gradually increased from the minimum duty cycle to perform the soft-start operation. At this moment, the output voltage of the buck converter 110 (the same as the input voltage of the resonant converter 120) gradually increases to restrict the impulsion of the current, generated at startup, to perform the over-current protection process.

Figure 4:
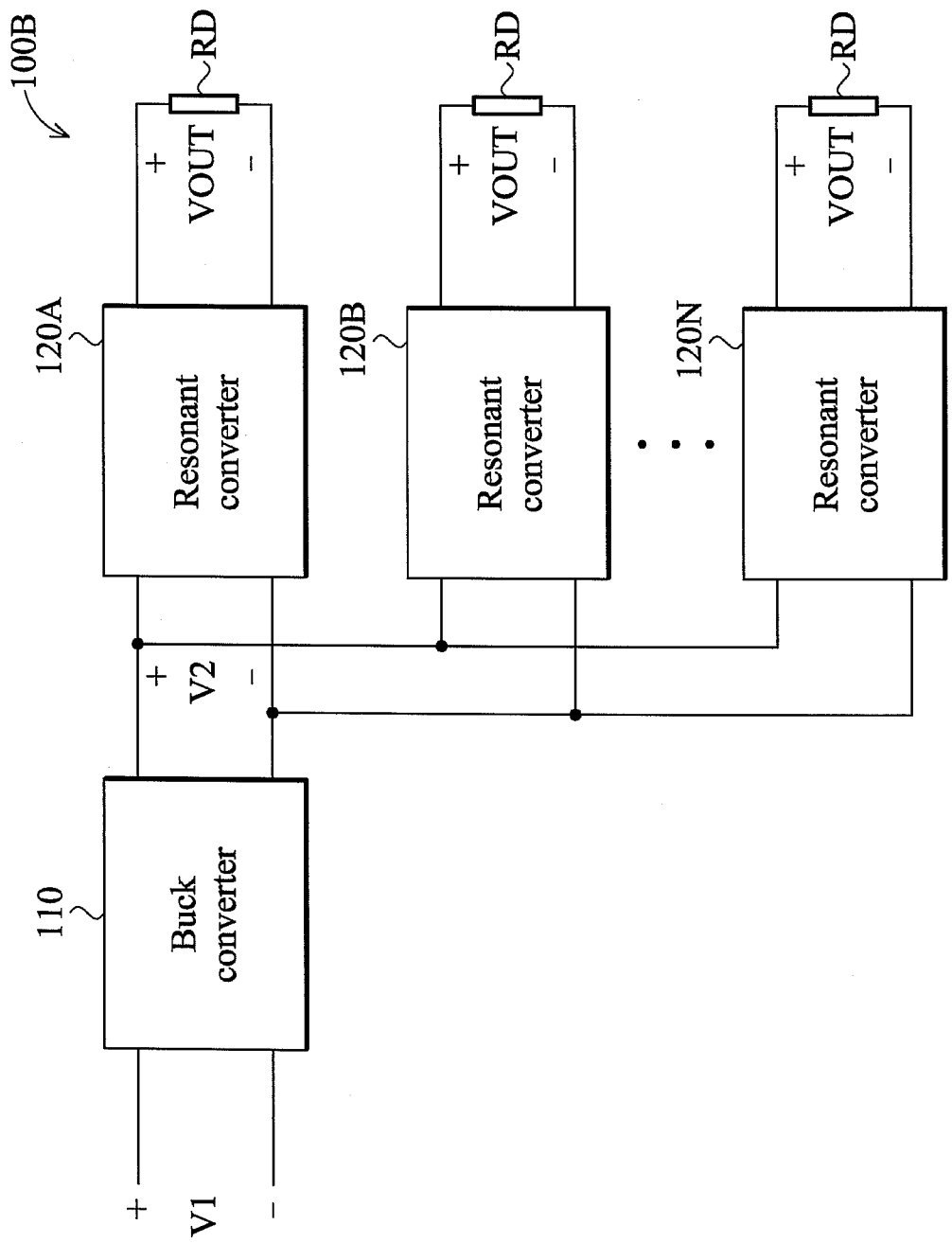
FIG. 4 is another embodiment of the resonant conversion system of the invention.

FIG. 4 shows an embodiment of the resonant conversion system of the present invention. As shows in FIG. 4, the resonant conversion system 100B is similar to the resonant conversion system 100A shown in FIG. 3. The difference is that the buck converter 110 provides the voltage V2 to a plurality of resonant converters 120A~120N rather than only one resonant converter 120. Similarly, when the resonant converter 100B is powered on, the duty cycle of the buck converter 110 is gradually increased from the minimum duty cycle to perform the soft-start operation. Therefore, the output voltage of the buck converter 110 (the same as the input voltage of the resonant converter 120) is gradually increased to restrict the impulsion of the current, generated at startup, to perform the over-current protection process.

Figure 5:
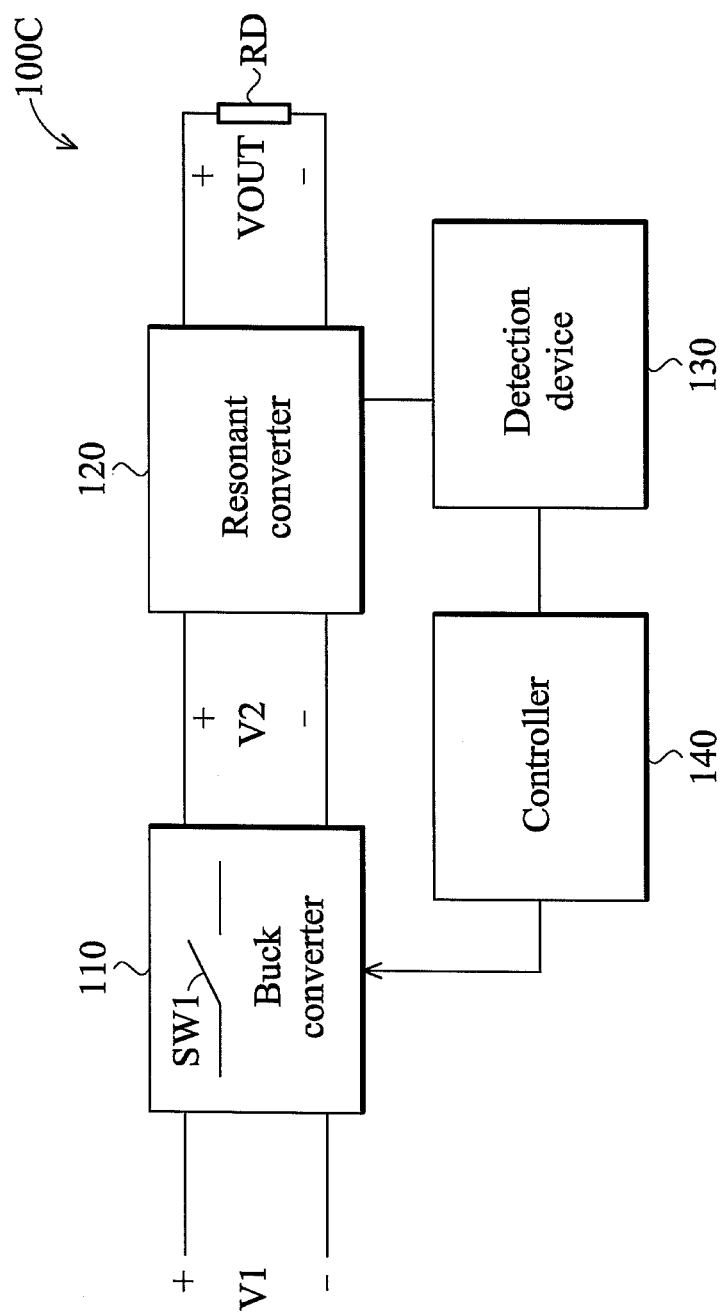
FIG. 5 is another embodiment of the resonant conversion system of the invention.

FIG. 5 shows an embodiment of the resonant conversion system of the present invention. As shows in FIG. 5, the resonant conversion system 100C is similar to the resonant conversion system 100A shown in FIG. 3. The difference is that the resonant conversion system 100C can not only further detect the signal corresponding to the output current of the resonant converter 120, but also can provide the detection result to the controller 140. Consequently, the controller 140 controls the buck converter 110 to decrease the output power or the output voltage of the buck converter 110 when the resonant converter 120 generates an over-current (e.g., is over-loaded, short-circuited or at startup), such that the input voltage of the resonant converter 120 is restricted for performing over-current protection process.

The detection device 130 is coupled to the resonant converter 120 to detect a signal corresponding to the output current of the resonant converter 120 and then provide the detection result to the controller 140. Consequently, the controller 140 controls the buck converter 110 to decrease the output power or the output voltage (the voltage V2) of the buck converter 110 with a control signal, such that the input voltage of the resonant converter 120 (the voltage V2) is restricted for performing the over-current protection process, when the resonant converter 120 generates the over-current (e.g., is over-loaded, short-circuited or at startup). Note that the output voltage of the buck converter 110 (such as the voltage V2) is not lower than the input voltage V1 of the buck converter 110 when the resonant converter 120 operates normally. For example, the voltage V2 is equal to the input voltage V1. On the contrary, the output voltage of the buck converter 110 (such as the voltage V2) is lower than the input voltage V1 of the buck converter 110 when the resonant converter 120 operates abnormally.

In some embodiments, the signal used to reflect the output current of the resonant converter 120 can be the output current of the resonant converter 120 itself. In detail, the detect device 130 detects the output of the resonant converter 120 directly and provides the detection result to the controller 140. In the other embodiments, the signal used to reflect the output current of the resonant converter 120 can also be one or more of the voltages across the resonant capacitor (also referred as the resonant capacitor voltage), or the current of the high-frequency transformer (such as the magnetizing inductor current or the resonant current), but is not limited thereto. Note that when the resonant converter 120 operates normally (i.e., there is no over-current), the switching device SW1 of the buck converter 110 operates in an always-on state (i.e., the switching device SW1 is maintained in an open state). In this embodiment, only when the resonant converter 120 generates an over-current, the switching device SW1 of the buck converter 110 would operate in a switching state, according to the control generated from the controller 140, to decrease the output voltage of the buck converter 110. However, in some embodiments, the switching device SW1 of the buck converter 110 enters an auto-switching mode to take control of increasing the output voltage of the buck converter 110 (i.e., the input voltage of the resonant converter 120) in a slow gradual way for performing the over-current protection process. In some embodiments, the buck converter 110 can also be a semi-regulated buck converter; which means that the buck converter 110 is controlled in close-loop only when the resonant converter 120 operates abnormally and the switching device of the buck converter 110 would operate in the permanent-open state for the rest of the time. In some embodiments, the buck converter 110 can also be a regulated buck converter; which means that the buck 110 is controlled in a close loop. When the resonant converter 120 operates normally, the output of the buck converter 110 depends on a reference signal (also can be a variable reference signal), and when the resonant converter 120 operates abnormally, the buck converter 110 performs the current restriction. In addition, the resonant converter 120 can also be a half-regulated resonant converter.

For example, when the output voltage VOUT is lower than a first reference value, the output current of the resonant converter 120 is higher than a second reference value, the resonant capacitor voltage is higher than a third reference value, the magnetizing inductor current is higher than a fourth reference value or the resonant current is higher than a fifth reference value, the controller 140 can determine that the resonant conversion system is over-loaded, short-circuited or at startup. Therefore, the controller 140 decreases the duty cycle of the switching device SW1 of the buck converter 110 to decrease the output power or the output voltage (such as the voltage V2) of the buck converter 110. Thus, the input voltage (such as the voltage V2) of the resonant converter 120 can be restricted for performing over-current protection process. In addition, the controller 140 can also increase the switching frequency of the switching device SW1 of the resonant converter 120 to restrict the current for achieving better current restriction.

Figure 6:
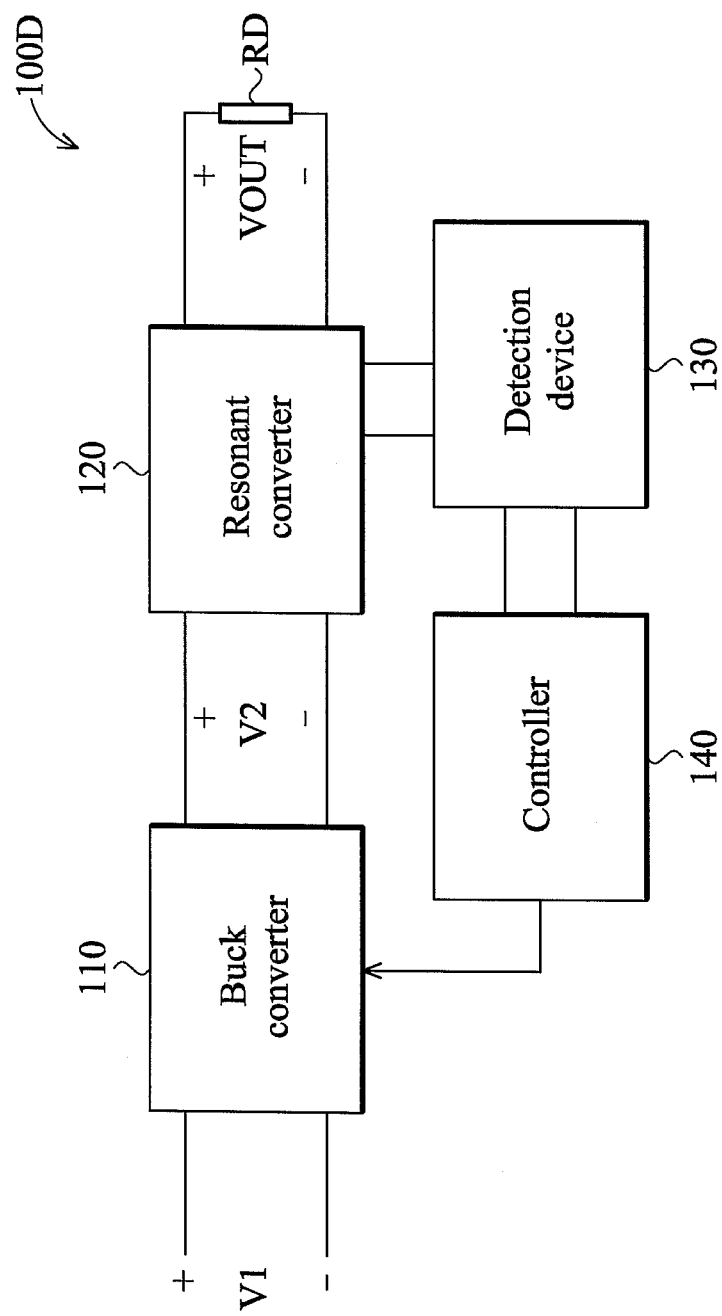
FIG. 6 is another embodiment of the resonant conversion system of the invention.

FIG. 6 shows another embodiment of the resonant conversion system of the invention. As shown in FIG. 6, the resonant conversion system 100D is similar to the resonant conversion system 100C shown in FIG. 5. The difference is that the resonant conversion system 100D can not only further detect the signal corresponding to the output current of the resonant converter 120, but also detect the output voltage VOUT of the resonant converter 120, and provide the detection results to the controller 140. Consequently, when the resonant converter 120 generates over-current (such as over-load, short-circuit or startup over-current), the controller 140 controls the buck converter 110 to decrease the output power or the output voltage of the buck converter 110, such that the input voltage of the resonant converter 120 is restricted for performing the over-current protection process. In this embodiment, the resonant converter 120 can also be a regulated resonant converter. In one embodiment, the detection device 130 can also be divided into two units to detect the signal corresponding to the output current of the resonant converter 120 and the output voltage VOUT of the resonant converter 120, respectively. For example, when the signal corresponding to the output current of the resonant converter 120 is higher than a reference value and/or the output voltage VOUT of the resonant converter 120 is lower than another reference value, the controller 140 can determine that the resonant conversion system is over-loaded, short-circuited or at startup. Therefore, the controller 140 decreases the duty cycle of the switching device of the buck converter 110; thereby, decreasing the output power or the output voltage (such as the voltage V2) of the buck converter 110. Thus, the input voltage (such as the voltage V2) of the resonant converter 120 can be restricted for performing over-current protection process. Operations of the buck converter 110 and the resonant converter 120 are similar to that of the same elements shown in FIG. 3, and thus, are omitted for brevity.

Figure 7:
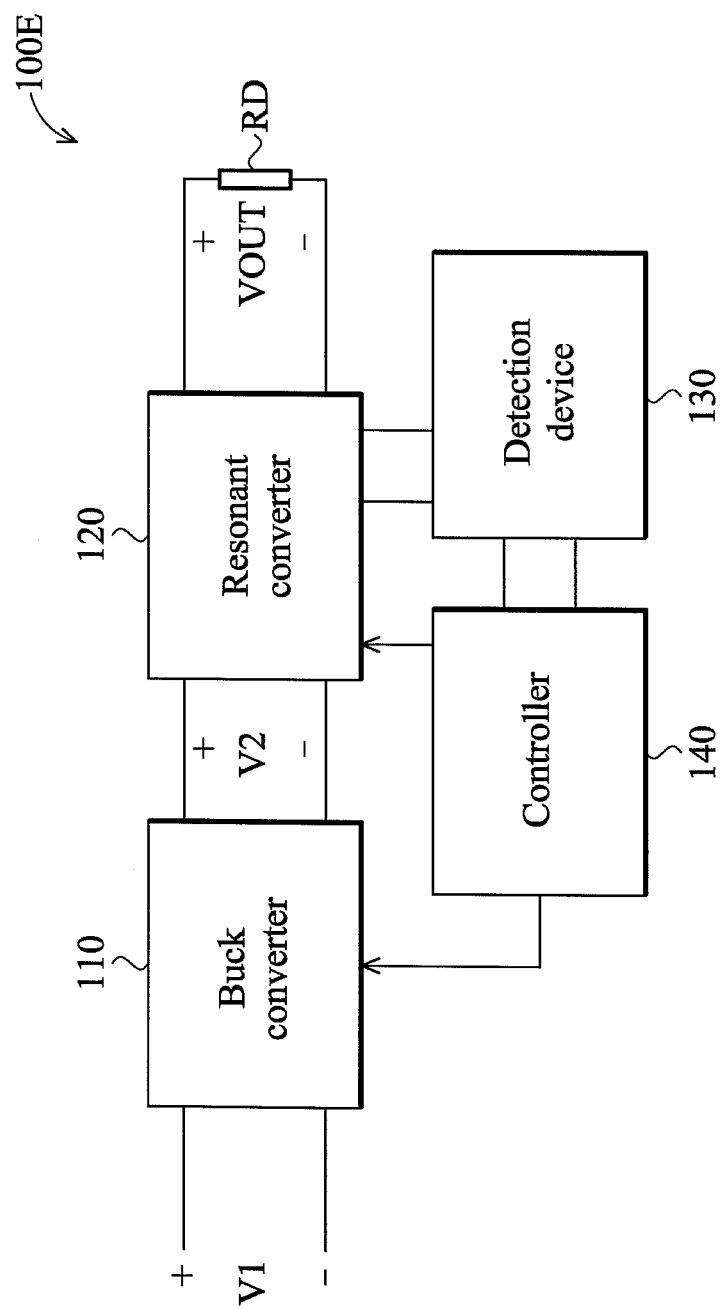
FIG. 7 is another embodiment of the resonant conversion system of the invention.

FIG. 7 is another embodiment of the resonant conversion system of the invention. As shown in FIG. 7, the resonant conversion system 100E is similar to the resonant conversion system 100D shown in FIG. 6. The difference is that the controller 140, according to the detection results, respectively controls the buck converter 110 and the resonant converter 120 to perform the current restriction. In this embodiment, the detection device 130 can also be divided into two units to respectively detect the signal corresponding to the output current of the resonant converter 120, and the output voltage VOUT of the resonant converter 120. In this embodiment, the resonant converter 120 can also be a regulated resonant converter and the controller 140 not only provides the control signal to the buck converter 110, but also provides the control signal to the resonant converter 120. For example, when the signal corresponding to the output current of the resonant converter 120 is higher than a reference value and/or the output voltage VOUT of the resonant converter 120 is lower than another reference value, the controller 140 can determine that the resonant conversion system is over-loaded, short-circuited or at startup. Therefore, the controller 140 decreases the duty cycle of the switching device of the buck converter 110; thereby decreasing the output power or the output voltage (such as the voltage V2) of the buck converter 110 for performing the over-current protection process. In addition, the controller 140 increases the switching frequency of the switching device of the resonant converter 120 to perform the current restriction. Operations of the buck converter 110, the resonant converter 120, the detection device 130 and the controller 140 are similar to that of the same elements shown in FIGS. 5 and 6, and thus, are omitted for brevity.

Figure 8:
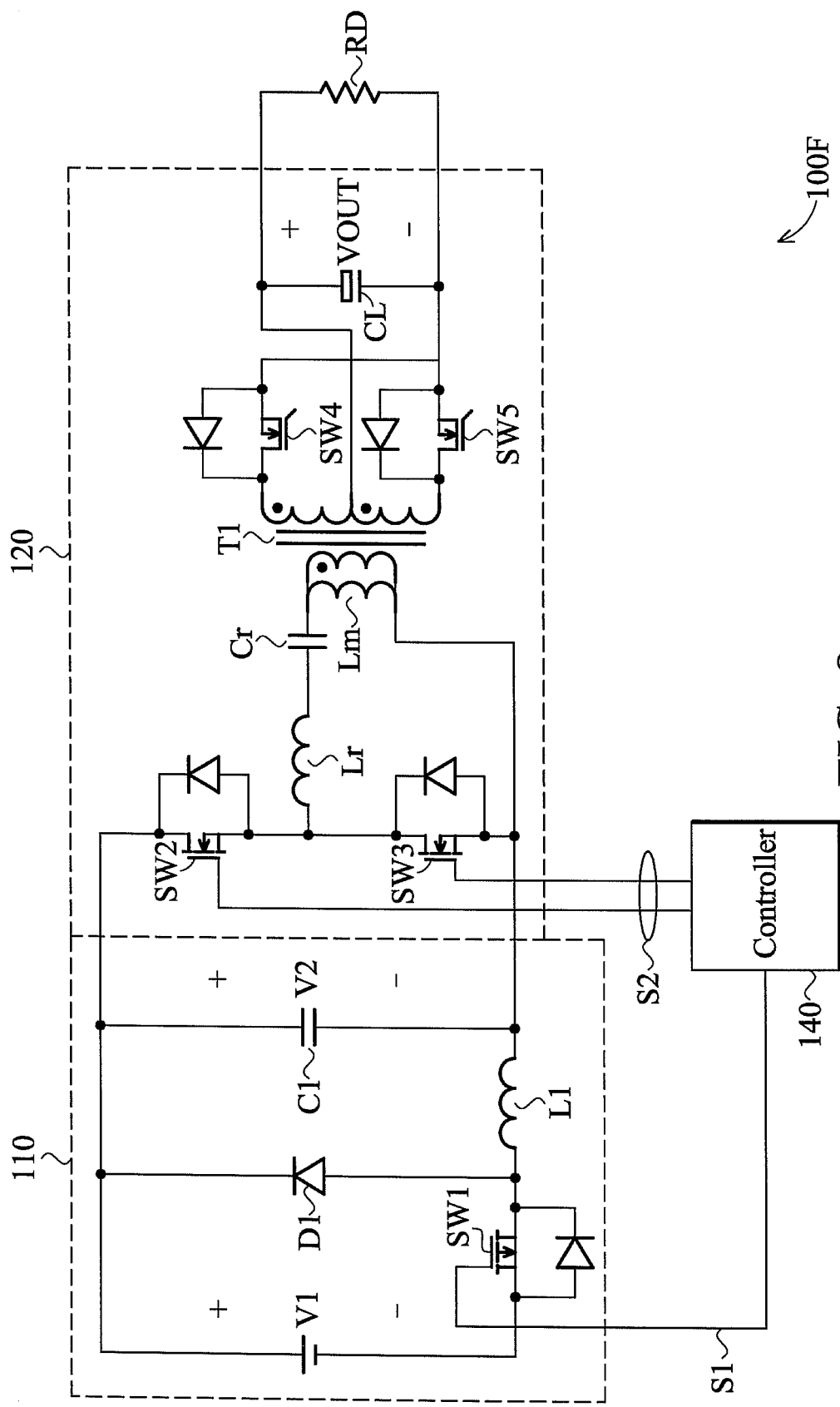
FIG. 8 is another embodiment of the resonant conversion system of the invention.

FIG. 8 is another embodiment of the resonant conversion system of the invention. As shown in FIG. 8, the buck converter 110 comprises the switching device SW1, a diode D1, a inductor L1 and a capacitor C1, wherein the duty cycle of the switching device SW1 is controlled by the control signal S1 output from the controller 140; thereby, adjusting the input voltage V1 to the voltage V2 as the input voltage of the resonant converter 120. The resonant converter 120 is a LLC resonant converter and comprises switching devices SW2~SW5, a resonant inductor Lr, a resonant capacitor Cr, a magnetizing inductor Lm, a transformer T1 and an output capacitor CL. Note that, when the resonant converter 120 operates normally (namely, there is no over-current), the switching device SW1 of the buck converter 110 operates in an always-on state (i.e., the switching device SW1 is maintained in an open state).

For example, the switching devices SW2 and SW3 form the square wave generator, and the resonant inductor Lr, the resonant capacitor Cr and magnetizing inductor Lm form the resonant circuit, and the switching devices SW4 and SW5 form the output rectifying circuit, but are not limited thereto. The switching devices SW2 and SW3 transform the input voltage V2 to the square wave voltage according to the control signal S2 generated by the controller 140 and then provide the square wave voltage to the resonant circuit (such as the resonant inductor Lr, the resonant capacitor Cr, magnetizing inductor Lm and the transformer T1). The resonant circuit resonates according to the square wave voltage generated by the switching devices SW2 and SW3; thereby, delivering the energy from the transformer T1 to the secondary winding. The switching devices SW4 and SW5 are coupled to the secondary winding of the transformer T1 to transform the energy from the secondary winding of the transformer T1 to the loading RD (i.e., provide the output voltage VOUT to the loading RD).

The controller 140 controls the switching device SW1 of the buck converter 110 and the switching devices SW2 and SW3 of the resonant converter 120. At the startup of the resonant conversion system 100F (i.e., when the resonant conversion system 100F is powered on), the controller 140 increases the duty cycle of the buck converter 110 from the minimum value of the duty cycle by the control signal S1, such that the output voltage V2 (such as the input voltage of the resonant converter 120) of the buck converter 110 can be slowly and gradually increased. Thus, the controller 140 protects the resonant converter 120 from current impulsion, generated at startup, for performing the over-current protection process. In some embodiments, the resonant converter 120 can also be a regulated or half-regulated resonant converter.

Figure 9:
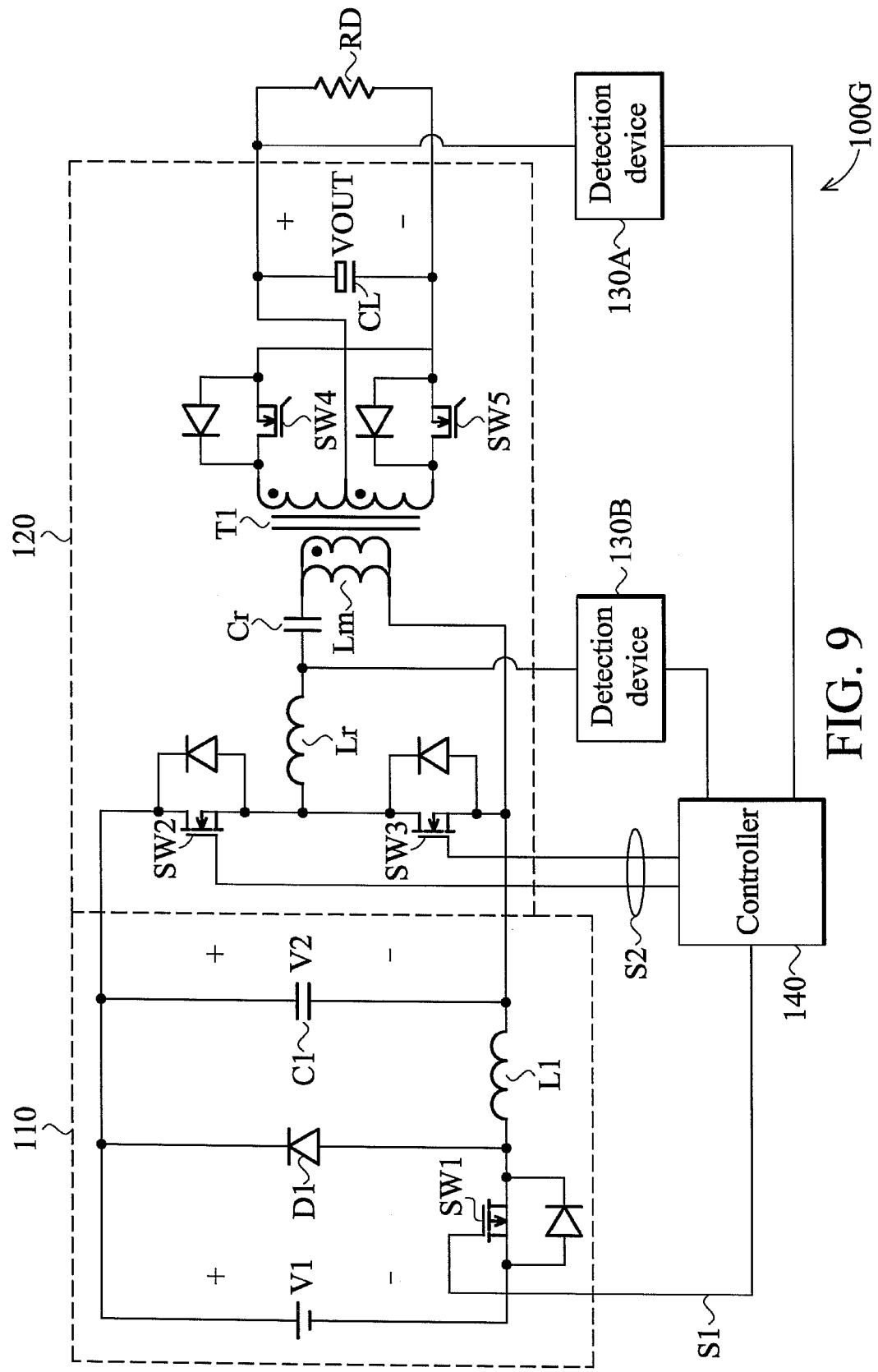
FIG. 9 is another embodiment of the resonant conversion system of the invention.

FIG. 9 is another embodiment of the resonant conversion system of the invention. As shown in FIG. 9, the resonant conversion system 100G is similar to the resonant conversion system 100F shown in FIG. 8, with the exception that the detection devices 130A and 130B have been added. The detection device 130A detects the output voltage VOUT of the resonant converter 120 to provide the detection result to the controller 140. The detection device 130B detects the signal corresponding to the output current of the resonant converter 120 to provide the detection result to the controller 140. For example, the signal corresponding to the output current of the resonant converter 120 can be the voltage across the resonant capacitor Cr (also referred as the resonant capacitor voltage hereinafter), or one or more of the currents of the high frequency transformer (e.g., the magnetizing inductor current or the resonant current). The controller 140 controls the switching device SW1 of the buck converter 110 and the switching devices SW2 and SW3 of the resonant converter 120 according to the detection results provided by the detection devices 130A and 130B.

In this embodiment, when the output voltage VOUT is lower than a reference value and/or the signal corresponding to the output current of the resonant converter 120 is higher than another reference value, the controller 140 can determine that the resonant conversion system is over-loaded, short-circuited or at startup. For example, when the output voltage VOUT is lower than a first reference value, the output current of the resonant converter 120 is higher than a second reference value, the resonant capacitor voltage is higher than a third reference value, and the magnetizing inductor current is higher than a fourth reference value or the resonant current is higher than a fifth reference value, such that the controller 140 can determine that the resonant conversion system is over-loaded, short-circuited or at startup. Therefore, the controller 140 decreases the duty cycle of the switching device of the buck converter 110 to decrease the output power or the output voltage (such as the voltage V2) of the buck converter 110. Thus, the input voltage (such as the voltage V2) of the resonant converter 120 can be restricted for performing over-current protection process. Note that the output voltage VOUT of the resonant converter, which is detected by the detection device 130A, controls the output of the resonant converter 120. In some embodiments, when the controller 140 decreases the duty cycle of the switching device SW1 of the buck converter 110, the controller 140 increases the switching frequency of the switching devices SW2 and SW3 of the resonant converter 120 to restrict the current for achieving better current restriction.

Figure 10:
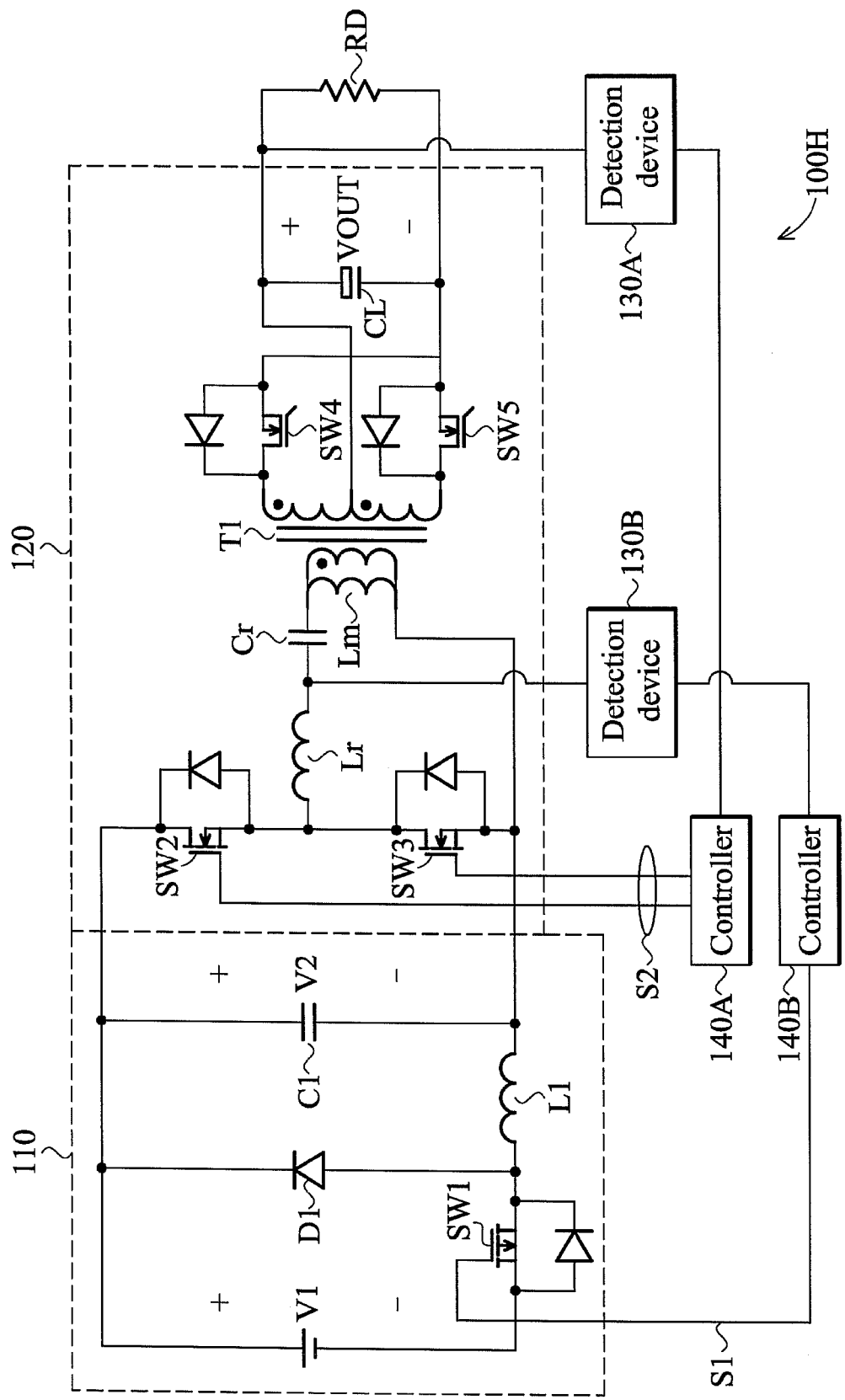
FIG. 10 is another embodiment of the resonant conversion system of the invention.

FIG. 10 is another embodiment of the resonant conversion system of the invention. As shown in FIG. 10, the resonant conversion system 100H is similar to the resonant conversion system 100G shown in FIG. 9, the difference is that the controller 140A and 140B respectively control the resonant converter 120 and the buck converter 110 according to the detection results of the detection devices 130A and 130B; thereby, performing the over-current protection process when the resonant converter 120 generates over-current (i.e., is over-loaded, short-circuited or at startup). For example, the controller 140A not only mainly controls the output of the resonant converter 120 according to the voltage VOUT detected by the detection device 130A, but also increases the switching frequency of the switching devices SW2 and SW3 of the resonant converter 120 with the control signal S2 to perform the current restriction when the resonant converter 120 generates the over-current. Furthermore, when the resonant converter 120 generates the over-current, the controller 140B decreases the duty cycle of the switching device SW1 of the buck converter 110 with the control signal S1 for performing the over-current protection process. Operations of the buck converter 110, the resonant converter 120 and the detection devices 130A and 130B are similar to that of the same elements shown in FIG. 9, and thus, are omitted for brevity.

Figure 11:
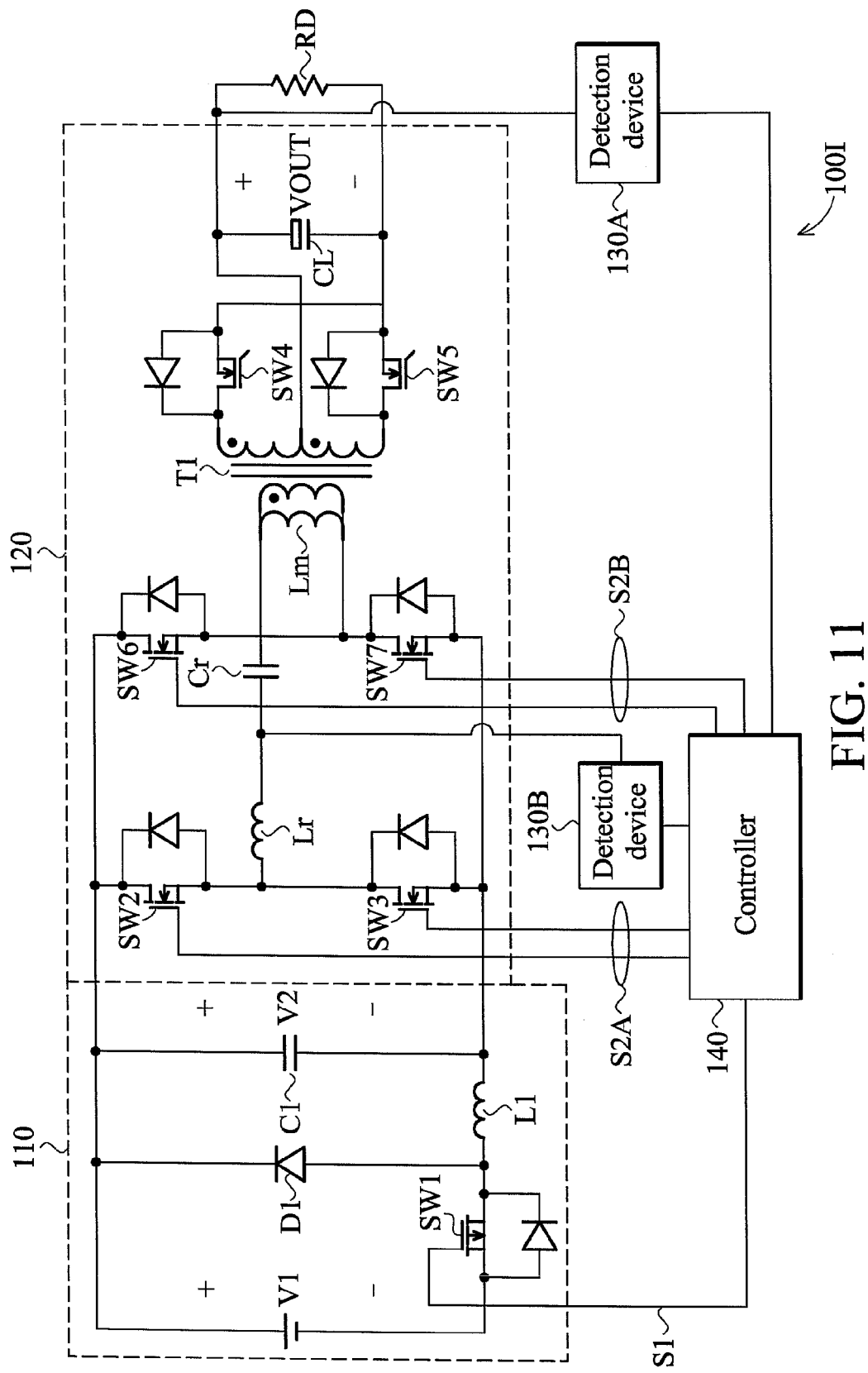
FIG. 11 is another embodiment of the resonant conversion system of the invention.

FIG. 11 is another embodiment of the resonant conversion system of the invention. As shown in FIG. 11, the resonant conversion system 100I is similar to the resonant conversion system 100G shown in FIG. 9, wherein the difference is that the resonant converter 120 further comprises the switching devices SW6 and SW7. Namely, the resonant converter 120 is a full-bridge resonant converter rather than a half-bridge resonant converter. For example, when the resonant converter 120 generates the over-current, the controller 140 decreases the duty cycle of the switching device SW1 of the buck converter 110 with the control signal S1 for performing the over-current protection process. In addition, when the resonant converter 120 generates the overt-current, the controller 140 increases the switching frequency of the switching devices SW2, SW3, SW6 and SW7 of the resonant converter 120 with the control signal S2 for performing the current restriction. Operations of the buck converter 110, the resonant converter 120, the detection devices 130A and 130B and the controller 140 are similar to that of the same elements shown in FIG. 9, and thus, are omitted for brevity. In some embodiments, the controller 140 can also be replaced with the controllers 140A and 140B shown in FIG. 10.

Figure 12A:
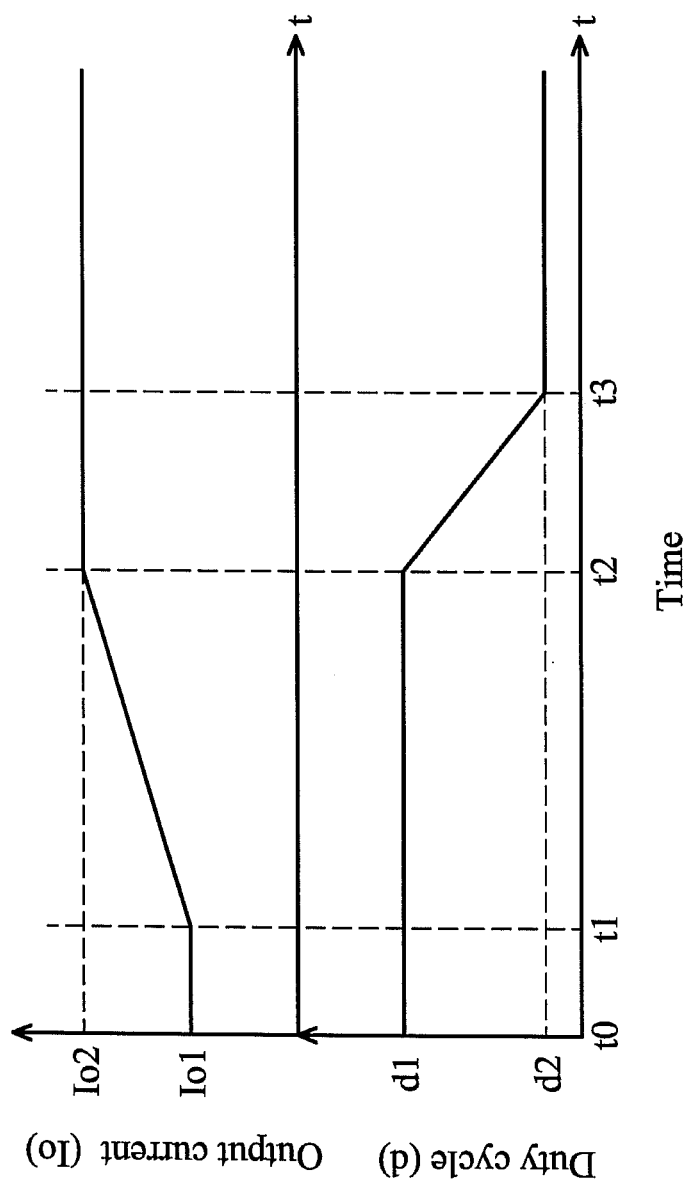
FIG. 12A is a waveform showing the resonant conversion system of the embodiment generating the over-current, wherein the over-current due to the resonant converter 120 is over-loaded or short-circuited.
Figure 12B:
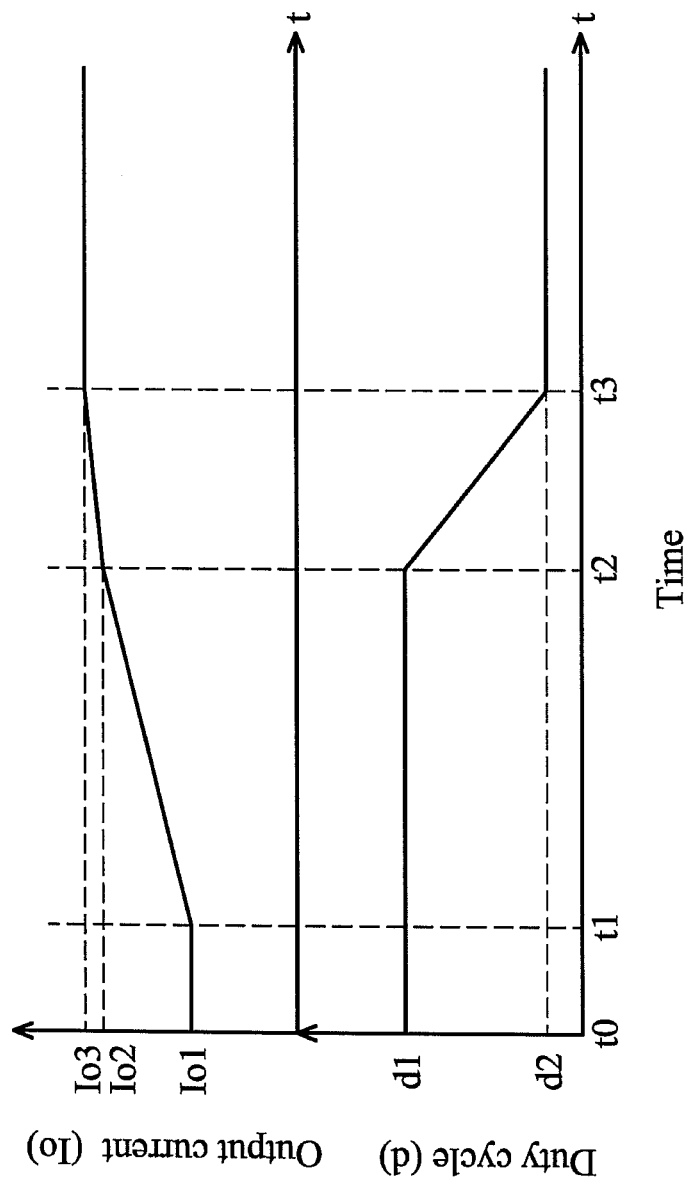
FIG. 12B is another waveform showing the resonant conversion system of the embodiment generating the over-current.

FIG. 12A is a waveform showing the resonant conversion system of the embodiment generating an over-current, wherein the over-current is due to the resonant converter 120 is over-loaded or short-circuited. As shown in FIG. 12A, Io is the output current of the resonant converter 120 and d is the duty cycle of the switching device SW1 of the buck converter 110. At the time t0 to t1, the resonant converter 120 operates normally, so the output current Io of the resonant converter 120 is not higher than a first predetermined current Io1 (such as a rated current) and the duty cycle of the switching device SW1 of the buck converter 110 is operated as a maximum duty cycle d1. For example, the buck converter 110 of the buck converter 110 operates in the always-on state such that the resonant conversion system works in high efficiency. At the time t1 to t2, the output current Io of the resonant converter 120 is increased but the duty cycle of the switching device SW1 of the buck converter 110 is unchanged. At the time t2, the output current Io of the resonant converter 120 exceeds a second predetermined current Io2. At this moment, the controller can determine that the resonant converter generates the over-current, such that the duty cycle of the switching device SW1 of the buck converter 110 is decreased. As shown in FIG. 12A, the duty cycle of the switching device SW1 of the buck converter 110 is decreased to a minimum duty cycle d2 (namely, the input voltage of the buck converter 120 is decreased to a lower value); thereby, restricting the output current VOUT of the resonant converter 120 effectively. Namely, in the embodiment, the output Io of the resonant converter 120 can be restricted in the second predetermined current Io2. FIG. 12B is another waveform showing the resonant conversion system of the embodiment generating the over-current. In this embodiment, when the output current Io of the resonant converter 120 exceeds the predetermined current Io2, the controller can determine that the resonant converter 120 generates the over-current. Thus, the controller can decrease the duty cycle of the switching device SW1 of the buck converter 110 from d1, but the output current Io of the resonant converter 120 is not restricted in the predetermined current Io2 and slightly increased. Finally, the output current Io of the resonant converter 120 is restricted in a third predetermined current Io3 which is higher than the predetermined current Io2, but not increased with time. At this moment, the controller decreases the duty cycle of the switching device SW1 of the buck converter 110 to the minimum duty cycle d2.

Figure 13A:
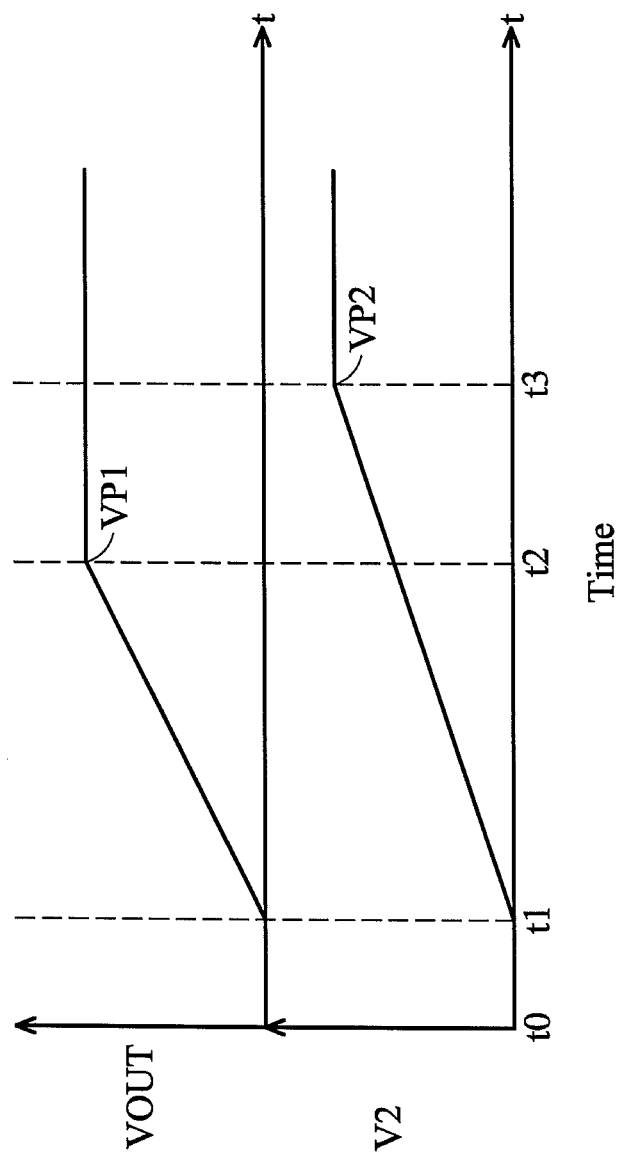
FIG. 13A is a waveform showing the resonant conversion system of the embodiment at startup.
Figure 13B:
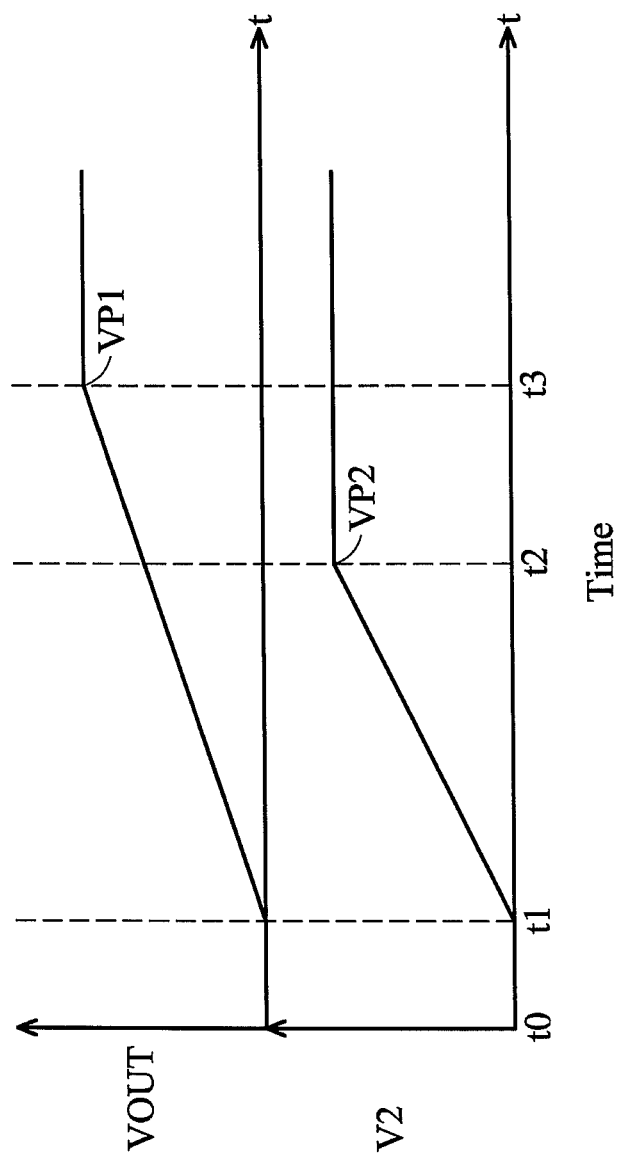
FIG. 13B is a waveform showing the resonant conversion system of the embodiment at startup.

FIG. 13A is a waveform showing the resonant conversion system of the embodiment at startup, wherein VOUT is the output voltage of the resonant converter 120 and V2 is the output voltage of the buck converter 110. As shown in FIG. 13A, at the time t1, the resonant converter 120 and the buck converter start at the same time. At the time t2, the output voltage VOUT of the resonant converter 120 exceeds a first predetermined voltage VP1 (such as the rated output voltage of the resonant converter 120), and then the output voltage of the bulk converter exceeds a second predetermined voltage VP2 (such as the rated output voltage of the buck converter 110) at the time t3. FIG. 13B is a waveform showing the resonant conversion system of the embodiment at startup. As shown in FIG. 13B, at the time t1, the resonant converter 120 and the buck converter essentially start at the same time. At the time t2, the output voltage of the buck converter 110 exceeds the second predetermined voltage VP2 first, and then the output voltage VOUT of the resonant converter 120 exceeds the predetermined voltage VP1 at the time t3.

The invention also provides a method for the over-current protection by efficiently restricting the resonant current or the output current of the resonant converter when the resonant conversion system is over-loaded, short-circuited or at startup. The method for the over-current protection comprises setting the buck converter 110 to operate in a soft-start manner at startup for performing the over-current protection process. For example, at startup, the duty cycle of the buck converter 110 is increased from the minimum duty cycle to perform the soft-start operation. At this moment, the output voltage (such as the input voltage of the resonant converter) of the buck converter 110 gradually increases to prevent over current impulsion for performing the over-current protection process.

The method for the over-current protection also comprises: detecting the signal corresponding to an output current of a resonant converter and generating a first detection result; determining whether the resonant converter generates the over-current according to the first detection result; and decreasing an input voltage of the resonant converter for performing the over-current protection process when the resonant converter generates the over-current. In the embodiments of the invention, the signal corresponding to the output current of the resonant converter can also be at least one of the output current of the resonant converter, a resonant capacitor voltage, a magnetizing inductor current and a resonant current, but is not limited thereto. Furthermore, the method for over-current protection can further comprise detecting the output voltage of the resonant converter and outputting the second detection result; thereby, determining whether the resonant converter generates the over-current according to the first and second detection results.

For example, the controller determines that the resonant converter generates the over-current when the output voltage is lower than a first reference value and/or the signal corresponding to the output current of the resonant converter is higher than a second reference value. When the resonant converter generates the over-current, the controller decreases the duty cycle of the switching device of the buck converter; thereby, decreasing the output power or the output voltage of the buck converter. Thus, the input voltage (such as the voltage V2) of the resonant converter is restricted for performing the over-current protection process. In addition, when the resonant converter generates the over-current, the controller increases the switching frequency of the switching device of the resonant converter to restrict the current for achieving better current restriction. In some embodiments, the controller determines that the resonant converter generates the over-current when the output current exceeds a first predetermined current of the resonant converter, so that the input voltage (such as the voltage V2) is restricted for performing the over-current protection process. In addition, when the resonant converter generates the over-current, the controller increases the switching frequency of the switching devices of the resonant converter to restrict the current for achieving better current restriction. In some embodiments, when the output current of the resonant converter exceeds a first predetermined current, the controller determines that the resonant converter generates the over-current. Hence, the output current of the resonant converter is restricted in the first predetermined current by decreasing the duty cycle of the switching device of the buck converter and/or increasing the switching frequency of the switching device of the resonant converter. In some embodiments, when the output of the resonant converter exceeds a first predetermined current, the controller determines that the resonant converter generates the over-current. Hence, the output current of the resonant converter is restricted in a second predetermined current higher than the first predetermined current by decreasing the duty cycle of the switching device of the buck converter and/or increasing the switching frequency of the switching device of the resonant converter.

When the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A resonant conversion system, comprising
   a resonant converter, receiving an input voltage to generate an output voltage;
   a buck converter, providing the input voltage and controlling the input voltage for performing an over-current protection process; and
   a first controller, decreasing a duty cycle of a switching device of the buck converter to decrease the input voltage received by the resonant converter, when the resonant converter generates the over-current,
   wherein, when an output current exceeds a first predetermined current, the first controller determines that the resonant converter generates the over-current, and restricts the output current of the resonant converter in the first predetermined current or in a second predetermined current higher than the first predetermined current.

2. The resonant conversion system as claimed in claim 1, wherein the duty cycle of the buck converter is increased from a minimum duty cycle when the resonant conversion system is powered on, such that the input voltage of the resonant converter is progressively increased for performing the over-current protection process.

3. The resonant conversion system as claimed in claim 1, further comprising at least one detection device detecting a signal corresponding to the output current of the resonant converter and outputting a first detection result to the first controller, such that the first controller, according to the first detection result, determines whether the resonant converter generates the over-current.

4. The resonant conversion system as claimed in claim 3, wherein the signal corresponding to the output current of the resonant converter comprises one or more of the output current, a resonant capacitor voltage, a magnetizing inductor current and a resonant current of the resonant converter.

5. The resonant conversion system as claimed in claim 4, wherein the first controller determines that the resonant converter generates the over-current, when the signal corresponding to the output current of the resonant converter is higher than a reference value.

6. The resonant conversion system as claimed in claim 3, wherein the at least one detection device further detects the output voltage of the resonant converter and outputs a second detection result to the first controller, such that the first controller, according to the first and second detection results, determines whether the resonant converter generates the over-current.

7. The resonant conversion system as claimed in claim 6, wherein the first controller determines that the resonant converter generates over-current, when the output voltage is lower than a first reference value and/or the signal corresponding to the output current of the resonant converter is higher than a second reference value.

8. The resonant conversion system as claimed in claim 1, wherein, when the resonant converter generates the over-current, the first controller further increases a switching frequency of the switching device of the resonant converter for performing the over-current protection process.

9. The resonant conversion system as claimed in claim 1, wherein the resonant converter is a regulated converter, a non-regulated converter or a half-regulated converter, and the buck converter is a half-regulated converter or a regulated converter.

10. A resonant conversion system, comprising:
    a resonant converter;
    a buck converter, providing a DC voltage to serve as an input voltage of the resonant converter such that the resonant converter generates an output voltage; and
    a first controller, controlling the buck converter to decrease the input voltage received by the resonant converter for performing an over-current protection process, when determining that the resonant converter has generated an over-current,
    wherein, when an output current exceeds a first predetermined current, the first controller determines that the resonant converter generates the over-current, and restricts the output current of the resonant converter in the first predetermined current or in a second predetermined current higher than the first predetermined current.

11. The resonant conversion system as claimed in claim 10, wherein, when the resonant converter generates the over-current, the first controller decreases a duty cycle of a switching device of the buck converter to decrease the input voltage received by the resonant converter.

12. The resonant conversion system as claimed in claim 11, further comprising
    a second controller, adjusting a switching frequency of the switching device of the resonant converter according to the output voltage of the resonant converter;
    a first detection device, detecting a signal corresponding to the output current of the resonant converter and outputting a first detection result to the first controller, such that the first controller, according to the first detection result, determines whether the resonant converter generates the over-current; and
    a second detection device, detecting the output voltage of the resonant converter and outputting a second detection result to the second controller, such that the second controller, according the second detection result, adjusts the switching frequency of the switching device of the resonant converter.

13. An over-current protection method, comprising
    detecting a signal corresponding to an output current of a resonant converter to generate a first detection result;
    determining whether the resonant converter generates an over-current according to the first detection result; and
    controlling a buck converter to decrease an input voltage of the resonant converter for performing an over-current protection process, when the resonant converter generates the over-current,
    wherein, when the output current of the resonant converter exceeds a first predetermined current, it is determined that the resonant converter generates the over-current, and the output current of the resonant converter is restricted in the first predetermined current or a second predetermined current higher than the first predetermined current.

14. The over-current protection method as claimed in claim 13, wherein, when the resonant converter generates the over-current, the resonant converter decreases the output voltage of the resonant converter by decreasing a duty cycle of a switching device of the buck converter.

15. The over-current protection method as claimed in claim 14, further comprising increasing a switching frequency of the switching device of the resonant converter for performing the over current protection, when the resonant converter generates the over-current.

16. The over-current protection method as claimed in claim 13, further comprising detecting an output voltage of the resonant converter to output a second detection result, wherein whether the resonant converter generates the over-current is determined according to the first and second detection result, and it is determined that the resonant converter generates the over-current, when the output voltage of the resonant converter is lower than a first reference value and/or the signal corresponding to the output current of the resonant converter is higher than a second reference value.

17. An over-current protection method, comprising
progressively increasing a duty cycle of a buck converter from a minimum duty cycle when a resonant conversion system is powered on, such that an input voltage of a resonant converter is progressively increased;
detecting a signal corresponding to an output current of the resonant converter to generate a first detection result;
determining whether the resonant converter generates over-current according to the first detection result; and
controlling the buck converter to decrease the input voltage of the resonant converter for performing an over-current protection process, when the resonant converter generates the over-current,
wherein the over-current protection process comprises restricting the output current of the resonant converter in a first predetermined current or in a second predetermined current higher than the first predetermined current.

18. The resonant conversion system as claimed in claim 1, wherein when the resonant converter generates the over-current, the buck converter further decreases the input voltage received by the resonant converter for performing the over-current protection process.

* * * * *